United States Patent
Jin et al.

(10) Patent No.: US 6,304,561 B1
(45) Date of Patent: Oct. 16, 2001

(54) METHOD AND APPARATUS FOR REGULATION OF THE EFFECTIVE NOISE FIGURE IN A CDMA RECEIVER

(75) Inventors: Xin Jin, Nepean; Hong-Kui Yang, Ottawa; John Nielsen, Calgary; Neil McGowan, Stittsville; Jeff Stanier, Ottawa, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/996,996

(22) Filed: Dec. 23, 1997

(51) Int. Cl.$^7$ .............................. H04B 7/216; H04Q 7/00
(52) U.S. Cl. ............................................. 370/332; 370/335
(58) Field of Search ....................................... 370/317, 318, 370/320, 328, 331, 332, 335, 342; 375/130, 136, 137, 140, 147, 150; 455/522, 561.63, 67.3, 132, 278.1

(56) References Cited

U.S. PATENT DOCUMENTS

| | | | | |
|---|---|---|---|---|
| 5,267,262 | * | 11/1993 | Wheatley, III | 375/200 |
| 5,559,790 | * | 9/1996 | Yano et al. | 370/342 |
| 5,675,581 | * | 10/1997 | Soliman | 370/252 |
| 5,729,571 | * | 3/1998 | Park et al. | 375/206 |
| 5,781,542 | * | 7/1998 | Tanaka et al. | 370/342 |
| 5,870,425 | * | 2/1999 | Piaget et al. | 375/200 |

\* cited by examiner

*Primary Examiner*—Wellington Chin

(57) ABSTRACT

The present invention relates to a method for effecting regulation of the effective noise figure of a CDMA (Code Division Multiple Access) receiver. The regulation process can be used to control the receiver during the activation/deactivation of a cell/sector in a CDMA wireless system and during normal operation when the service area of the cell/sector needs to enlarge or shrink. In a most preferred embodiment the CDMA receiver includes a source of pseudo-random noise that is injected in the received signal, downstream of the signal digitization stage. A power detector measures the power in the received digitized signal and a program logic determines the amount of noise figure degradation to be applied. The actual noise power regulation is effected by multiplying the output of the noise generator by a weighing factor. In a multi-channel CDMA system, each channel is provided with an independent system to regulate the effective noise power figure degradation, thus allowing to effect a noise figure regulation on a channel by channel basis.

2 Claims, 2 Drawing Sheets

METHOD AND APPARATUS FOR REGULATION OF THE EFFECTIVE NOISE FIGURE IN A CDMA RECEIVER

FIELD OF THE INVENTION

This invention reI general to wireless communications and, more particularly to a method and apparatus for regulating the effective noise figure of a CDMA receiver in a base station. The regulation may be effected to control the blossoming/breathing or wilting functions of a CDMA communication system.

BACKGROUND OF THE INVENTION

In a CDMA wireless system the activation or deactivation of-a cell/sector affects the network. The sudden activation of the cell/sector causes a sudden increase in the total forward link power. This may temporarily degrade the forward link performance of the network and possibly cause the calls in other cells/sectors close to the activating cell/sector to be dropped due to the sudden increase of channel interference from the activating cell/sector. In addition, the sudden deactivation of a cell/sector will result in calls in the cell/sector being dropped. To avoid this problem, when a cell/sector is activated in a CDMA wireless system, the transmitted power of the transmitter at the base station is increased gradually, while the effective noise figure of the receiver at the base station is gradually decreased accordingly. This allows the users in the neighboring cells/sectors who are subject to the interference from the activating cell/sector to have enough time to handoff to the activating cell/sector. The synchronized gradual increase of the transmitted power and decrease in the receiver effective noise figure is known as "blossoming". Similarly, the synchronized gradual decrease in the transmitted power and increase in the receiver effective noise figure is known as "wilting". This occurs when a cell/sector is deactivated. Wilting allows the users in the deactivating cell/sector to have enough time to handoff to neighboring cell/sectors, rather than being dropped. During normal operation of the cell/sector the balance between the forward link handoff boundary and the reverse link handoff boundary must be constantly maintained. This operation, known as "breathing", is also effected by balancing the transmitted power and the effective noise figure at the receiver. In order to keep the handoff boundaries balanced, for every one dB change in transmitted power there must be an opposing one dB change in the receiver effective noise figure.

The implementation of the receiver blossoming, breathing and wilting functions has been traditionally effected in the analog chain of the receiver at the RF or at the analog IF stages by degrading its noise figure. Practically, this is traditionally effected by altering a variable attenuator located at the RF section or the early stages of the IF section, prior to any channel separation. The drawbacks of this approach are:

1. inaccurate control due to gain and/or noise figure instability (over temperature, aging, non-linearity, etc.)
2. this method is not suitable for effecting noise power regulation on a channel by channel basis in a multichannel CDMA receiver in which the channels share the same RF section and early stages of IF section.

Thus, there is a need in the industry to provide a CDMA receiver capable to implement the blossoming, breathing and wilting functions while alleviating the difficulties associated with prior art methods.

SUMMARY OF THE INVENTION

The present invention provides a CDMA receiver including an input for receiving an RF signal, an analog signal processing stage for processing the RF signal and a plurality of channels connected to the analog signal processing stage. The RF signal includes a plurality of components separable from one another, where each channel receives a signal derived from a respective component of the RF signal. Each channel includes an effective noise figure regulation unit operative to generate a noise signal and introduce the noise signal into the signal derived from the respective component of the RF signal, for regulating an effective noise figure of the signal derived from the respective component of the RF signal.

The effective noise figure regulation may be effected in the analog processing unit or the digital processing unit of each channel. In a specific embodiment the channels of the receiver process independent CDMA signals separated by frequency. Most preferably, the effective noise figure regulation unit is located in the digital processing unit of the channel. The effective noise figure regulation unit includes a source of noise, such as a synthesized pseudo-random noise that is injected in the signal path. For easier control it is preferred to inject the signal at the digital baseband stage. At the baseband stage, the noise can be injected in the signal before or after the channel select filter. To determine the amount of noise to inject into the signal path for a given effective noise figure change, a power detector is used to measure the actual receiver noise power. Based on the information supplied by the power detector, the noise source can be controlled to effectively regulate the receiver effective noise figure degradation.

In a specific embodiment the effective noise figure can be defined as $$\frac{SNR_i}{SNR_o}$$

where SNRi is the signal to noise ratio at the antenna port and $SNR_o$ is the signal to noise ratio at the CDMA modem input port.

An important advantage of this arrangement is the ability to regulate the effective noise figure on a channel by channel basis. Since each channel of the CDMA receiver has an independent effective noise figure regulation unit, the amount of noise introduced in the signal path of each channel may vary from one channel to another.

DESCRIPTION OF A PREFERRED EMBODIMENT

Figure 1:
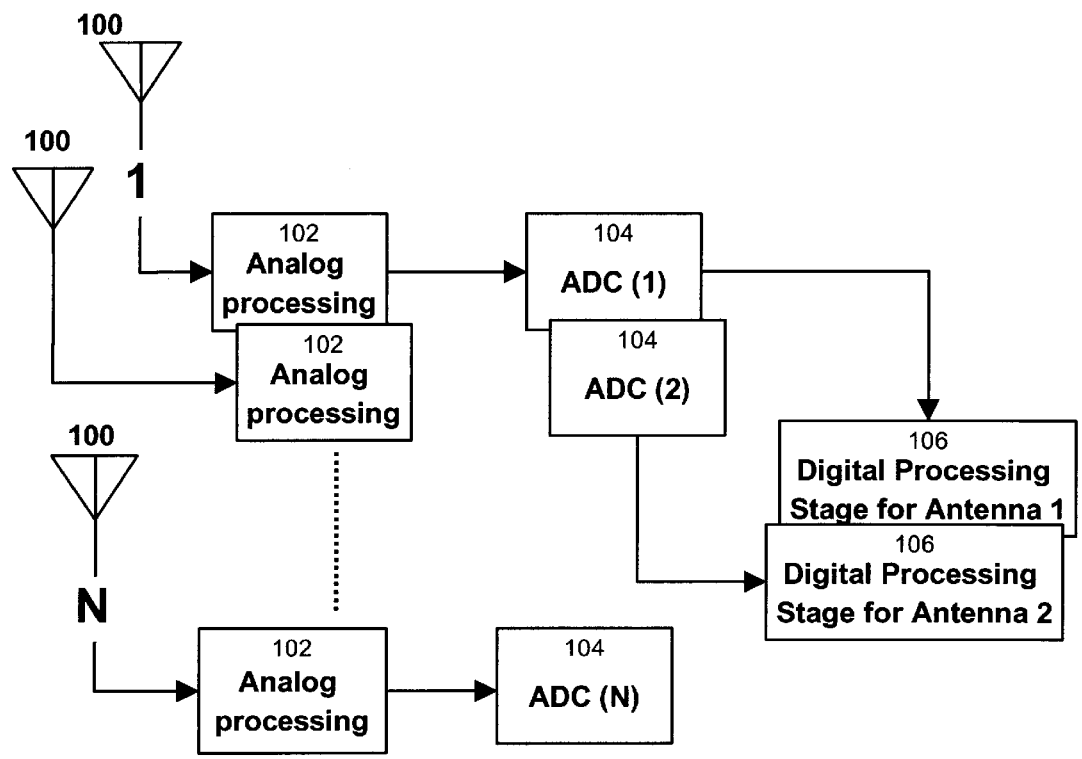
FIG. 1 is a block diagram of a CDMA receiver constructed in accordance with the most preferred implementation of the present invention.
Figure 2:
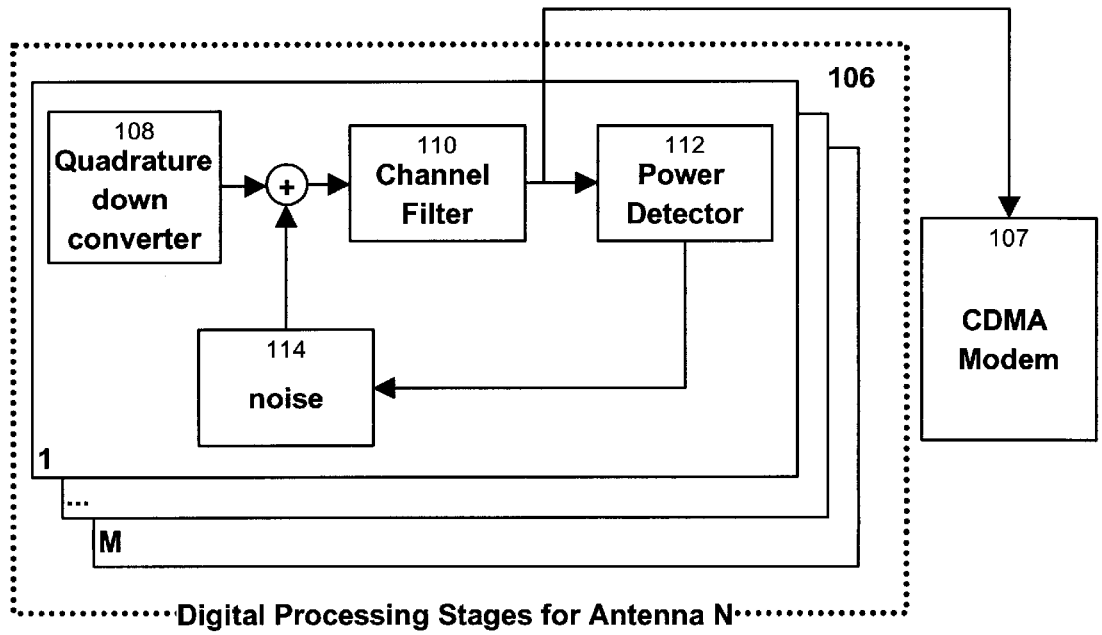
FIG. 2 is a detailed block diagram of a digital processing stage of the CDMA receiver shown in FIG. 1.

FIG. 1 of the annexed drawings illustrates a CDMA receiver implementing the regulation function of effective noise figure in accordance with the present invention. The receiver comprises a plurality of antennas 100. In the example shown, N different antennas are provided, the antennas may be from different sectors of a given cell, for example. The RF signal received by a given antenna is then introduced into M separate channels. Those channels share a common analog processing stage 102. In the example shown, the common analog processing stage 102 includes a frequency downconverter, whose function is to reduce the frequency of the received signal to a certain IF frequency. The analog processing stage may also include frequency selective filters. For simplicity, those components are not detailed in the drawings because they are known to those skilled in the art. The signal generated by the common analog processing stage 102 is supplied to an analog to digital converter (ADC) 104, also common to the M channels. The analog to digital converter 104 digitizes the input signal that is then supplied to an array 106 of digital processing units for each channel. Each digital processing unit of the array 106 as shown in FIG. 2 includes a quadrature downconverter functional block 108 that leads to a channel select filter 110. The structure and operation of the quadrature downconverter functional block 108 and of the channel select filter 110 do not need to be described in detail because these components are well known to the person skilled in the art.

The signals output from the digital processing units from the array 106 are supplied to a CDMA modem 107 that is designed to despread the signal and also to decode the user signal.

In addition, the digital processing unit of each channel includes a noise generator 114 that adds a noise signal stream to the data stream issued by the quadrature downconverter filtering functional block 108. This addition is equivalent to injection of noise into the original data stream from the quadrature downconverter functional block 108. The noise generator 114 operates under the control of a power detector 112 measuring the receiver noise power in the signal output by the channel select filter 110. The power detector 112 can be implemented by any suitable means capable to generate an output signal indicative of the receiver noise power. A mean square power detector has been found satisfactory. As it will be described later, the power detector 112 is used mainly to detect receiver noise power changes. Hence, the accuracy of the absolute receiver noise power is not critical. Accordingly, no absolute power calibration may be needed for the power detector. However, if for some reason the absolute receiver noise power level is to be determined, the power detector would need to be calibrated to take into account errors due to uncertainty in the gain of the analog stage 102.

Figure 3:
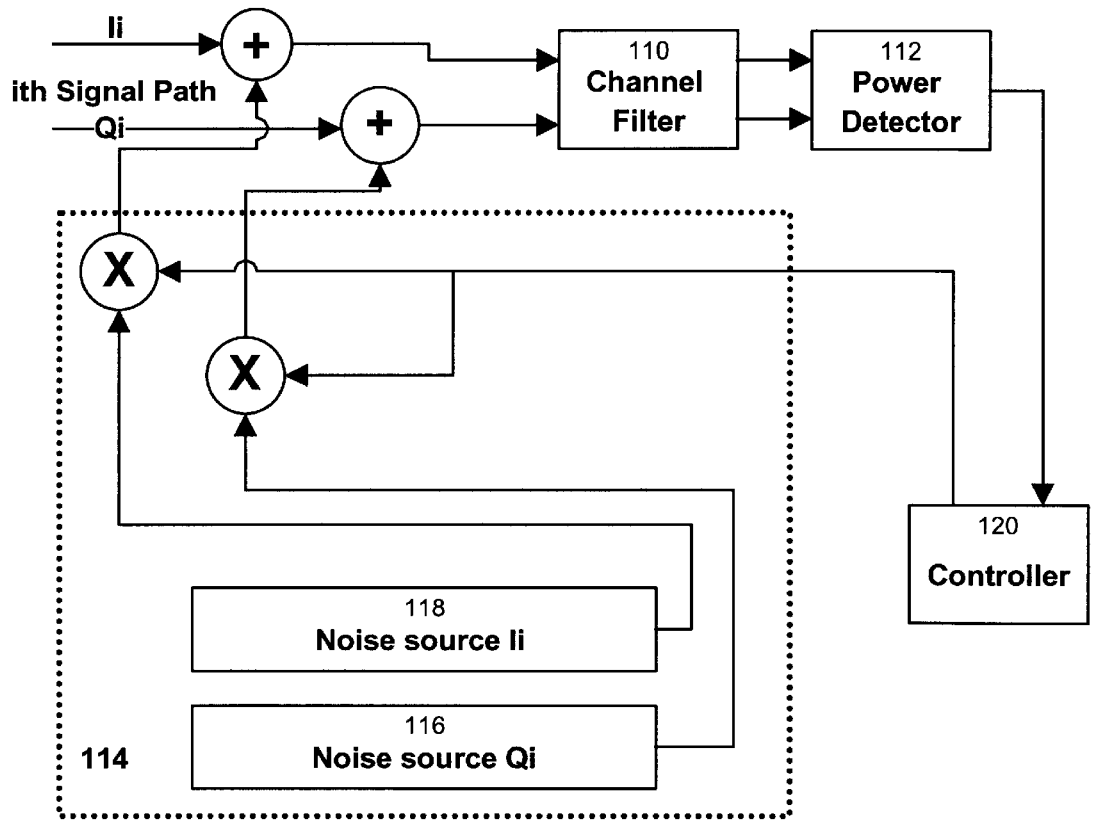
FIG. 3 is a detailed block diagram of the noise generator used in the CDMA receiver depicted at FIG. 1.

FIG. 3 of the annexed drawings provides a detailed illustration of the construction of the noise generator 114. The noise generator 114 provides two independent noise streams for the in-phase and quadrature signals in each path. More specifically, the noise generator includes a source 116 of synthetic pseudo-random noise and a companion source of synthetic pseudo-random noise 118, the source 116 being used to condition the in-phase signal while the source 118 being used for the quadrature signal. Most preferably, the noise sources 116 and 118 are of equal power output, Gaussian distribution and they are uncorrelated to one another. The output of each noise source is multiplied by a weighing factor that determines the amount of noise injected in the in-phase signal and in the quadrature signal. As for the mechanism for injecting the noise signals, it is effected by simple addition. The variance of the noise injected to the signal path as measured by the power detector 112 can be defined by the following equation:

$$N_{gi} = N_g * r * w_i^2$$

Where:
1) $N_{gi}$ is the variance of the noise injected to either one of the in-phase or quadrature signal of the digital processing unit of the ith channel;
2) Ng is the variance of the source of Gaussian noise, either source 116 or 118;
3) r is a constant factor due to the channel select filter $$r = \frac{1}{f_s} \int_{-f_s/2}^{f_s/2} |H(j2\pi f)|^2 df$$

Where $H(j2\pi f)$ is the transfer function of the channel select filter 110 and $f_s$ is the sampling frequency of the channel select filter;

4) $W_I$ is the noise weighing factor for a given source of noise.

Assume that the receiver noise for the ith channel measured by the power detector 112 in the digital processing unit is $N_{ri}$. The measured receiver noise power is the sum of the amplified thermal noise from the antenna, amplified device thermal noise (RF/IF signal chain and ADC contribution) and the quantization noise in the ADC and all digital stages prior to the power detector. No other interference in the signal is assumed to exist. The receiver effective noise degradation in dB can therefore be calculated as follows:

$$\Delta NF_i = 10 \log_{10}\left(\frac{N_{ri} + N_{gi}}{N_{ri}}\right), dB, i = 1, 2, \ldots M$$

In other words, if one wishes to degrade the receiver effective noise figure by:

$\Delta NF_i, dB$ for of the ith channel, the weighing factor can be calculated as follows:

$$W_i = \sqrt{\frac{1}{r}\left(10^{\frac{\Delta N_{ri}}{10}} - 1\right) N_{ri}/N_{gi}}, i = 1, 2, \ldots, M$$

To calculate the weighing factor for the ith channel with the above equation one should know the measured receiver noise power $N_{ri}$ and the desired effective noise figure degradation:

$\Delta NF_i, dB$

The receiver noise power $N_{ri}$ is the value reported by the power detector 112. As for the desired noise power degradation, this factor is computed by a controller 120 that regulates the noise power degradation in order to control the blossoming/wilting/breathing functions. The logic of the controller 120 does not need to be described here in detail. Suffice it to say that the controller 120 receives data indicative of the receiver noise power from the power detector 112 and on the basis of this variable and the required $\Delta NF_i$, dB, determines the required weighing factors. In a specific example, when implementing the breathing function described earlier, the controller 120 may be tracking the power output of the transmitter and vary, in accordance with the transmitted power the effective noise power figure of the ith channel. For instance, when the transmitted power increases by a certain amount, the controller 120 computes a value $W_I$ to create an equal but opposing change in the effective receiver noise figure. The computed weighing factor $W_i$ is then used for multiplying the outputs of the sources 116 and 118. The results of these multiplications are then added to the in-phase signal and to the quadrature signal.

Figure 4:
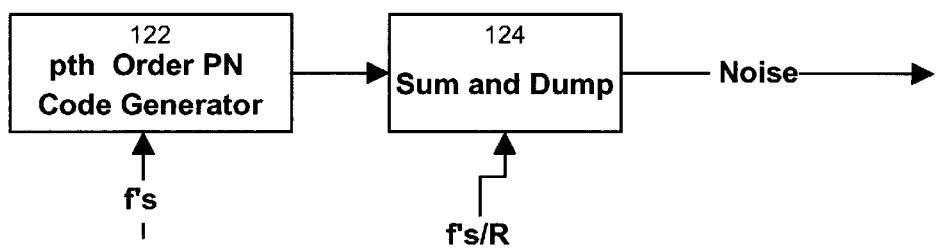
FIG. 4 is a block diagram of a device that can be used to generate pseudo-random noise.

FIG. 4 illustrates in greater detail the internal construction of any one of the noise sources 116,118. The source includes a $p^{th}$ order pseudo-noise generator 122 that receives a clock signal at a frequency $f_s$. The output of this pseudo-noise generator that is either 1 or −1 (0) is supplied to a sum and dump functional block 124 that essentially adds R consecutive code strings issued from the generator 122 and dumps the result at the output. The rate of the output is 1/R multiplied by the code rate $f_s$ of the pseudo-noise generator. As for the particular algorithm used for generating the pseudo-noise code strings based on an input clock signal, it is not deemed necessary to describe it herein because algorithms of this type are generally well known to those skilled in the art.

There are many possible variants for implementing the invention. For instance, some of the functions part of the digital processing stage for each channel depicted at FIG. 1, can be implemented with analog circuits. Namely, such analog stage may include the quadrature downconverter, analog channel selective filters (IF or baseband). The noise figure regulation means can be made part of such analog stage by providing a source of synthetic pseudo-random noise or analog random noise source that is injected in the signal path through an analog adder at baseband or IF stage. Still, such analog stage is part of the individual channel to enable independent regulation of the effective noise figure on a channel by channel basis. Based on the choices which part(s) are/is implemented by analog circuits, the location of the ADC should vary accordingly.

The above description of a preferred embodiment should not speed interpreted in any limiting manner as refinements and variations are possible without departing from the spirit of the invention. The scope of the invention is defined by the annexed claims.

We claim:

1. A CDMA receiver comprising:

an input for receiving an RF signal that includes a plurality of components separable from one another;

an analog signal processing stage connected to said input for processing the RF signal;

a plurality of channels connected to said analog signal processing stage, each channel receiving a signal derived from a respective component of the RF signal, each channel including an effective noise figure regulation unit operative to introduce a noise signal into the signal derived from the respective component of the RF signal for regulating an effective noise figure of the signal derived from the respective component of the RF signal, said noise figure regulation unit including a noise generator to generate said noise signal, said noise generator producing either one of a random and pseudo-random noise, said noise figure regulation unit being capable to:

a) measure a power of the signal derived from a respective component of the RF signal including the noise signal;

b) regulate a variance of the noise signal.

2. A method for regulating an effective noise figure of a signal in a multi-channel CDMA receiver, said method comprising:

acquiring a signal;

separating the signal into a plurality of components;

introducing each component in a respective channel of the CDMA receiver;

in each channel, gene rating a noise signal and introducing the noise signal into the component received in the channel, for regulating an effective noise figure of the component independently from other channels of the CDMA receiver, the noise signal being either one of a random and pseudo-random noise;

in each channel, measuring a power of the component including the noise signal to compute a variance of the noise signal.

* * * * *